(12) United States Patent
Schulz et al.

(10) Patent No.: US 7,346,813 B1
(45) Date of Patent: Mar. 18, 2008

(54) DISTRIBUTED EVENT REPORTING HIERARCHY

(75) Inventors: Jürgen M. Schulz, Pleasanton, CA (US); David L. Isaman, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 460 days.

(21) Appl. No.: 10/818,203

(22) Filed: Apr. 5, 2004

(51) Int. Cl.
*G06F 11/00* (2006.01)

(52) U.S. Cl. .......................... 714/48; 714/26
(58) Field of Classification Search ............... 714/48, 714/26
See application file for complete search history.

(56) References Cited

U.S. PATENT DOCUMENTS

| | | | |
|---|---|---|---|
| 5,596,716 A * | 1/1997 | Byers et al. ............... 714/48 |
| 6,006,016 A * | 12/1999 | Faigon et al. ............. 714/48 |
| 6,401,174 B1 | 6/2002 | Hagersten et al. |
| 6,536,000 B1 | 3/2003 | Jackson et al. |
| 6,708,291 B1 * | 3/2004 | Kidder ..................... 714/39 |
| 2002/0144193 A1 * | 10/2002 | Hicks et al. ............... 714/48 |
| 2002/0174389 A1 * | 11/2002 | Sato et al. ................. 714/48 |
| 2003/0101385 A1 * | 5/2003 | Lee ........................... 714/48 |
| 2004/0059966 A1 * | 3/2004 | Chan et al. ................ 714/48 |
| 2004/0199832 A1 * | 10/2004 | Powers et al. ............ 714/48 |

* cited by examiner

*Primary Examiner*—Yolanda L Wilson
(74) *Attorney, Agent, or Firm*—Lawrence J. Merkel; Meyertons, Hood, Kivlin, Kowert & Goetzel, P.C.

(57) ABSTRACT

In one embodiment, an apparatus comprises a plurality of core logic blocks, a plurality of first event blocks, and a second event block. Each of the plurality of core logic blocks is configured to generate one or more indications of one or more events. Each first event block of the plurality of first event blocks is coupled to a respective core logic block of the plurality of core logic blocks to receive the one or more indications from the respective core logic block. Each first event block comprises at least one register configured to record which events have been indicated by the respective core logic block. Coupled to the plurality of first event blocks, the second event block is configured to initiate one or more actions responsive to one or more events detected in one or more of the plurality of first event blocks.

48 Claims, 10 Drawing Sheets

DISTRIBUTED EVENT REPORTING HIERARCHY

BACKGROUND OF THE INVENTION

1. Field of the Invention

This invention is related to the field of event reporting, such as error reporting, in integrated circuits.

2. Description of the Related Art

Integrated circuits are often designed to detect certain types of errors and to log the errors in registers. Software reads the registers to determine what errors have been detected, and the software may attempt to take corrective action or inform a user of the problem so that the user may take corrective action.

In common integrated circuits, the errors to be logged may be detected anywhere within the integrated circuit. Signals indicating a given error must then be routed from the logic that detects the error to the register that logs the error. Routing the signals may cause congestion in the integrated circuit, particularly if a large number of errors are detected and recorded. Additionally, routing the signals long distances in the integrated circuit may cause timing issues.

As integrated circuit development (and, in some cases, software development of the software that interfaces to the integrated circuit) proceeds, various errors may be viewed as more or less severe. Similarly, the desired actions to be taken when various errors are detected may change. For example, in the development environment such as the lab, the actions to be taken may differ from those in the production environment such as the customer site. In the lab, it may be desirable to make the detection of the error observable external to the integrated circuit. Additionally, it may be desirable to treat detected errors as more severe in the lab than in the field, to aid in debugging. On the other hand, observability of the error in the customer environment may be less important while recovery from the error without user intervention may be more important.

SUMMARY OF THE INVENTION

In one embodiment, an apparatus comprises a plurality of core logic blocks, a plurality of first event blocks, and a second event block. Each of the plurality of core logic blocks is configured to generate one or more indications of one or more events. Each first event block of the plurality of first event blocks is coupled to a respective core logic block of the plurality of core logic blocks to receive the one or more indications from the respective core logic block. Each first event block comprises at least one register configured to record which events have been indicated by the respective core logic block. Coupled to the plurality of first event blocks, the second event block is configured to initiate one or more actions responsive to one or more events recorded in one or more of the plurality of first event blocks.

In another embodiment, an apparatus comprises a core logic block and an event block. The core logic block is configured to generate one or more indications of a plurality of events detectable by the core logic block. Coupled to the core logic block to receive the indications, the event block comprises one or more registers programmable to map at least one event of the plurality of events to one or more of a plurality of classes.

In still another embodiment, an apparatus comprises at least one core logic block configured to generate one or more indications of a plurality of events detectable by the core logic block. The apparatus further comprises an event circuit coupled to the core logic block to receive the indications. The event circuit is programmable to map at least one event of the plurality of events to one or more of a plurality of actions to be taken responsive to the events.

BRIEF DESCRIPTION OF THE DRAWINGS

The following detailed description makes reference to the accompanying drawings, which are now briefly described.

Figure 1:
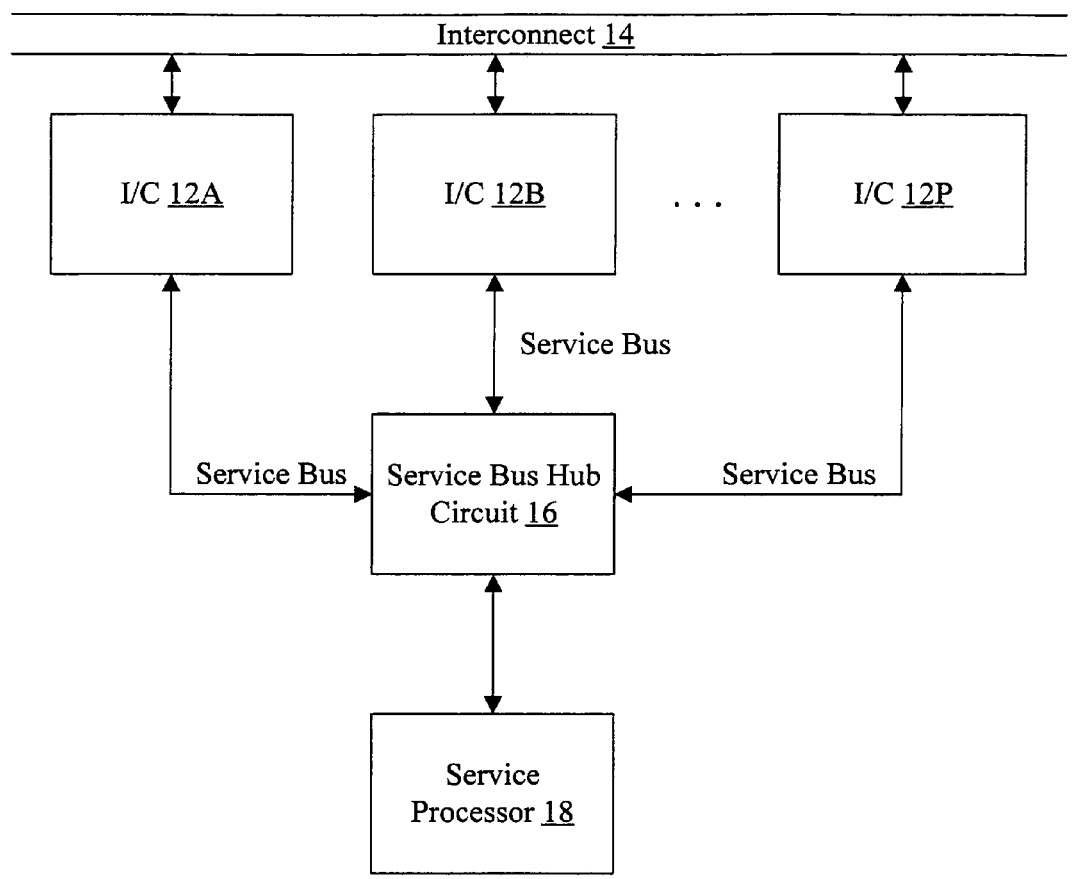
FIG. 1 is a block diagram of a system including a plurality of integrated circuits.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

The description herein refers to a bit in a register or on a signal as being indicative of a certain state when set and another state when clear. Other embodiments may reverse the sense of the set state and clear state, or may use any other indication of the state (e.g. various encodings of a multi-bit value).

Turning now to FIG. 1, a block diagram of one embodiment of a system 10 is shown. The system 10 may be any type of electronic system. For example, in some embodiments, the system 10 may be a computer system. In the embodiment of FIG. 1, the system 10 includes a plurality of integrated circuits (I/Cs) 12A-12P. Any number of integrated circuits 12A-12P, including one integrated circuit, may be included in various embodiments. The integrated circuits 12A-12P are coupled to an interconnect 14 to communicate between the integrated circuits 12A-12P during use. Additionally, each of the integrated circuits is coupled via a service bus to a service bus hub circuit 16, which is further coupled to a service processor 18.

The integrated circuits 12A-12P may implement various functions used in the system 10. For example, in a computer system implementation, integrated circuits 12A-12P may include any number of any of the following: a processor (also referred to as a central processing unit (CPU)), a bridge circuit that interfaces between different interconnects (e.g. between a peripheral interconnect and an interconnect with a processor, or between peripheral interconnects), a memory controller, a video controller, a graphics processor, a switch chip for the interconnect 14, a peripheral interface controller (e.g. a controller for peripheral component interconnect (PCI), universal serial bus (USB), firewire, small computer system interface (SCSI), integrated device electronics (IDE), etc.), a peripheral device (e.g. modem, network interface, audio device, video device, interfaces to user input/output devices), etc. Furthermore, integrated circuits 12A-12P may integrate two or more of the above, in some embodiments.

The integrated circuits 12A-12P may also be accessible to the service processor 18 via the service buses as shown in FIG. 1. The service bus hub circuit 16 may serve to route communications between the integrated circuits 12A-12P and the service processor 18. In some embodiments, the service bus hub circuit 16 may be a hierarchical interconnection of integrated circuits. In other embodiments, the service bus hub circuit 16 may be a single integrated circuit. In one implementation, each service bus is a pair of unidirectional serial buses (one in each direction). Other implementations may use any bus structure or other communication interconnect, as desired. The service processor 18 may be any type of processor, and may communicate with the service bus hub circuit using any type of interconnect (e.g. an interconnect similar to the service buses, or any other type of interconnect such as a PCI bus or other peripheral interconnect).

The interconnect 14 may be any type of interconnect that permits the desired communication between the integrated circuits 12A-12P. For example, in one particular implementation, the interconnect 14 comprises packet interfaces. In some embodiments, the packet interfaces may be hierarchical. Other embodiments may comprise one or more buses, or combinations of buses and packet interfaces. Other embodiments may comprise individual interfaces between integrated circuits that are customized to provide the communication, or combinations of such interfaces and any of the above interfaces.

Figure 2:
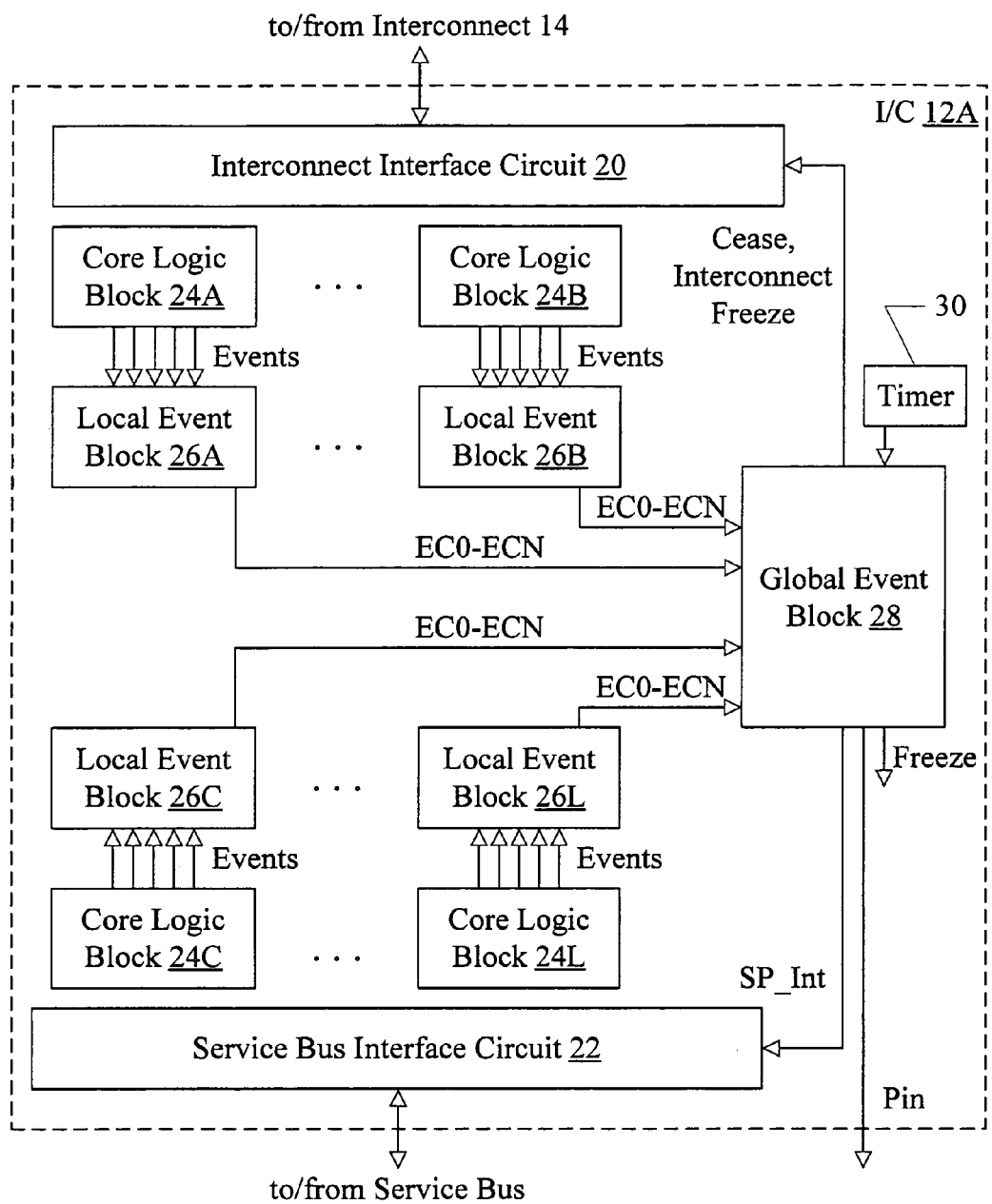
FIG. 2 is a block diagram of one embodiment of an integrated circuit.

Turning now to FIG. 2, a block diagram of one embodiment of the integrated circuit 12A is shown. One or more of the other integrated circuits 12B-12P may be similar. In the illustrated embodiment, the integrated circuit 12A includes an interconnect interface circuit 20, a service bus interface circuit 22, a plurality of core logic blocks 24A-24L, a plurality of local event blocks 26A-26L, a global event block 28, and a timer 30. There may be any number of core logic blocks 24A-24L in various embodiments. Each logic block 24A-24L is coupled to a respective one of the local event blocks 26A-26L, as shown in FIG. 2. That is, core logic block 24A is coupled to local event block 26A; core logic block 24B is coupled to local event block 26B; core logic block 24C is coupled to local event block 26C; core logic block 24L is coupled to local event block 26L; etc. Each of the local event blocks 26A-26L are coupled to the global event block 28, which is further coupled to the interconnect interface circuit 20, the service bus interface circuit 22, and the timer 30. The interconnect interface circuit 20 is coupled to the interconnect 14, and the service bus interface circuit 22 is coupled to the service bus.

The core logic blocks 24A-24L may each implement a portion of the functionality of the integrated circuit 12A. For example, integrated circuit designs are often partitioned into blocks of functionality. Each core logic block 24A-24L may be one of the partitioned blocks. Alternatively, core logic blocks 24A-24L may be determined by physical locality on the integrated circuit 12A substrate. In another alternative, core logic blocks 24A-24L may be divided according to various clock domains that may exist in the integrated circuit 12A. Any division of the circuitry in the integrated circuit 12A to the core logic blocks 24A-24L may be used. Generally, the term "block" as used with respect to various elements in FIG. 2 refers to any circuitry implementing a defined set of functionality. For example, each core logic block 24A-24L may comprise circuitry implementing various functions assigned to the integrated circuit 12A.

In addition to implementing its assigned function(s), each core logic block 24A-24L may also detect various events. As used herein, an event may comprise any occurrence detectable by the logic block. Each event may be predefined as part of the integrated circuit 12A design to be potentially of interest. For example, events may include errors. Events may also include other occurrences which, in themselves, are not errors but which may be indicative of errors elsewhere in the system or may be indicative of errors that may be about to occur. Events may further include other occurrences that may be communicated to software (e.g. the completion of an operation previously initiated by software).

Each core logic block 24A-24L may communicate indications of events to the corresponding local event block 26A-26L (e.g. the event signals shown in FIG. 2). The local event blocks 26A-26L may record which events have been indicated by the corresponding logic blocks 24A-24L. In some embodiments, each local event block 26A-26L may be physically located near its corresponding core logic block 24A-24L on the semiconductor substrate. Thus, routing of the event signals may be relatively short, which may, in some cases, relieve wiring congestion and timing concerns for the event signals. Each local event block 26A-26L may include one or more control/status registers (CSRs) to log the events indicated by the corresponding core logic block 24A-24L. An exemplary set of CSRs and corresponding operation of the local event block 26A is shown for one embodiment in FIG. 3 and discussed in more detail below.

In one embodiment, each local event block 26A-26L classifies the events indicated by the corresponding core logic block 24A-24L into one of a plurality of classes. For example, in the illustrated embodiment, classes 0 to N may be used. A given event may be included in zero classes (that is, the event may be deemed not to be of interest), one class, or multiple classes, in some embodiments. In one embodiment, the mapping of events to classes may be programmable. Thus, the class or classes to which a given event is mapped may be changed over time. Some classes may have more severe events in them than others. Thus, by changing the class to which a given event is mapped, the severity accorded to the event may be changed.

In the illustrated embodiment, the local event blocks 26A-26L signal which event classes have been detected to the global event block 28 (e.g. the EC0-ECN signals in FIG. 2, one signal for each class). In some embodiments, there may be significantly fewer classes than there are events in a local event block 26A-26L, and thus wiring congestion may be less than would be the case if individual events were signalled to the global event block 28. The local event blocks 26A-26L may store additional details of the events (e.g. which specific events have been detected, which was the initial event detected in a given class, etc.). The global event block 28 may track which local event blocks 26A-26L have detected events in the various classes.

The global event block 28 may initiate one or more actions responsive to the detected events. More particularly, in this embodiment, the actions initiated are responsive to which classes have been detected. Accordingly, if a given action is desired for a given event, that event may be included in one of the classes for which the global event block 28 initiates that given action. In some embodiments, the mapping of classes of events to actions may also be programmable. Thus, the activities that occur in response to a given event (based on the class or classes in which the event is included) may be varied as desired. For example, different actions may be initiated when the system 10 is in the lab or in the field.

As used herein, "actions" initiated by the global event block may comprise any desired operation. For example, actions may fall into one of three categories, in some embodiments: internal actions, freeze actions, and report actions. Internal actions may change the behavior of the integrated circuit 12A internally. For example, in the illustrated embodiment, the integrated circuit 12A may cease communicating on the interconnect 14 ("cease" signal from the global event block 28 to the interconnect interface circuit 20). The interconnect interface circuit 20 may inhibit initiating subsequent communications on the interconnect 14 responsive to the cease signal from the global event block 28. By ceasing communication if an error event is detected, even if the integrated circuit 12A has a communication to make, the integrated circuit 12A may prevent propagating erroneous data to other integrated circuits 12B-12P. Ceasing communication may be viewed as an internal event because it is done without providing any external indication that communication is ceasing (other than the lack of any communication itself). Similarly, another internal action may be to cause one or more core logic blocks 24A-24L to stop functioning. Such an action may isolate the core logic blocks 24A-24L that experienced an event, for example. Yet another internal action may be to disable certain functions within a core logic block or blocks 24A-24L.

Freeze actions may be used to stop operation at the current state, to preserve the state for debugging. For example, in the illustrated embodiment, freeze actions may include freezing the internal state of the integrated circuit 12A ("freeze" signal in FIG. 2) and freezing the state of the system 10 as a whole (e.g. by freezing communication on the interconnect 14). Freezing internal state may be accomplished by transmitting a freeze signal to each core logic block 24A-24L, or by gating clocks in the integrated circuit 12A with the freeze signal. The global event block 28 may signal to the interconnect interface circuit 20 to freeze the interconnect ("interconnect freeze" in FIG. 2). For example, in some embodiments, a special communication on the interconnect 14 may be used to freeze the interconnect, stopping any subsequent communication. The interconnect interface circuit 20 may transmit the special communication responsive to the interconnect freeze signal.

Report actions may be used to bring the event occurrence to the attention of software or a user. For example, report actions may include asserting a signal on a pin of the integrated circuit 12A-12P ("Pin" in FIG. 2) or raising an interrupt for a processor such as the service processor 18 ("SP_Int" in FIG. 2). Asserting a signal on a pin may be useful, for example, to provide observability of an event to a user in the lab. A logic analyzer or other monitoring device may be coupled to the pin and may display the signal on the pin for viewing by the user or may use the signal as a trigger to display other information. The interrupt may be used to inform software of the event, and software may read various state in the integrated circuit 12A to determine the event. There may be more than one interrupt level for different severity levels, in some embodiments, and report actions may include interrupts at any desired interrupt level or levels. The service bus interface circuit 22 may raise an interrupt to the service processor 18 responsive to the SP_Int signal.

Generally, as used herein, a class may be a logical grouping of events. Properties may be assigned to a class, and each event in the class may be assigned the properties via membership in the class. For example, events grouped into a class may have a similar severity level. Alternatively, events may be grouped into classes according to which actions are desired for those events.

In some embodiments, the global event block 28 may capture an indication of which local event block 26A-26L is the initial local event block (in time) to indicate that an event class has been detected. It may also be desirable to capture a timestamp indicative of the time at which the initial event class was detected. Timestamps from different integrated circuits 12A-12P may be compared, for example, to determine which integrated circuit 12A-12P in a system 10 detected an initial occurrence of an event. The timer 30 may comprise circuitry that provides an indication of time that may be used as a timestamp. For example, the timer 30 may be incremented at the expiration of a fixed period of time. The timer 30 may be synchronized at a point in time across integrated circuits 12A-12P, so that the values may be comparable (with a certain margin of error related to the fixed period of time used to increment the timer 30). Alternatively, one timer 30 may be implemented in the system 10 and outside the integrated circuits 12A-12P and may be shared by the integrated circuits 12A-12P. In yet another alternative, the timer 30 may be implemented in one of the integrated circuits 12A-12P and shared by other integrated circuits 12A-12P.

Generally, the interconnect interface circuit 20 may be responsible for transmitting communications generated by various core logic blocks 26A-26L on the interconnect 14, and for receiving communications from the interconnect 14 and routing the communications to the appropriate core logic blocks 26A-26L. Similarly, the service bus interface circuit 22 may receive and transmit communications on the service bus.

As mentioned above, the local event blocks 26A-26L may include various CSRs, and the global event block 28 may also include various CSRs. The CSRs may be used to provide programmability for the mapping of events to classes and the mapping of classes to actions. Additionally, CSRs may be used to log events, to log the initial event detected in a local event block 26A-26L for each class, to log the initial local event block 26A-26L to detect an event in each class, etc. The CSRs may also be addressable by software. For example, software executing on the service processor 18 may address the CSRs. Instructions executed by the service processor 18 that address CSRs may result in requests made on the service buses. Software executing on a processor coupled to the interconnect 14 may address the CSRs in some embodiments. Instructions executed by such a processor may be converted to requests on the interconnect 14. In one particular embodiment, multiple addresses may be used to access each CSR for different reasons. For example, a read to a first address may be used to read the CSR. In some cases, the same address may be used to write the entire contents of the register. Other addresses may be used to clear or set bits in the CSR without overwriting the entire contents of the CSR. Such other addresses may be used to avoid a race condition between hardware updating one bit in a CSR and software updating a different bit. For example, a second address may be defined for clearing bits. The data written to the second address may be treated as a bit field, with each bit in the field that is set causing the corresponding bit in the target register to be cleared. A third address may be defined for setting bits, and the data written to the third address may be treated as a bit field for which each set bit in the field causes the corresponding bit in the target register to be set.

In one particular embodiment, the various local event blocks 24A-24L and the global event block 28 may be coupled in a ring or other communication fashion with the service bus interface circuit 22 to permit addressing of the CSRs in the blocks 24A-24L and 28 via the service bus. A service bus request for a given CSR may be propagated around the ring to the block having that CSR, which may return the contents (for a read) or update the contents (for a write) of the CSR according to the request.

While the present embodiment describes a hierarchical mechanism for handling events (locally in the local event blocks 26A-26L and globally in the global event block 28), a mechanism for programmably classifying events to classes, and a mechanism for programmably mapping events (or classes) to actions, other embodiments may implement any one or more of the above mechanisms. For example, the hierarchical event handling may be implemented without the programmability mechanisms; the programmable mapping of events to classes may be implemented without the hierarchy or the programmable mapping of classes to actions; and the programmable mapping of classes to actions may be implemented without the hierarchy or the programmable mapping of events to classes. Furthermore, embodiments in which events are directly mapped to actions and the mapping is programmable are contemplated.

Figure 3:
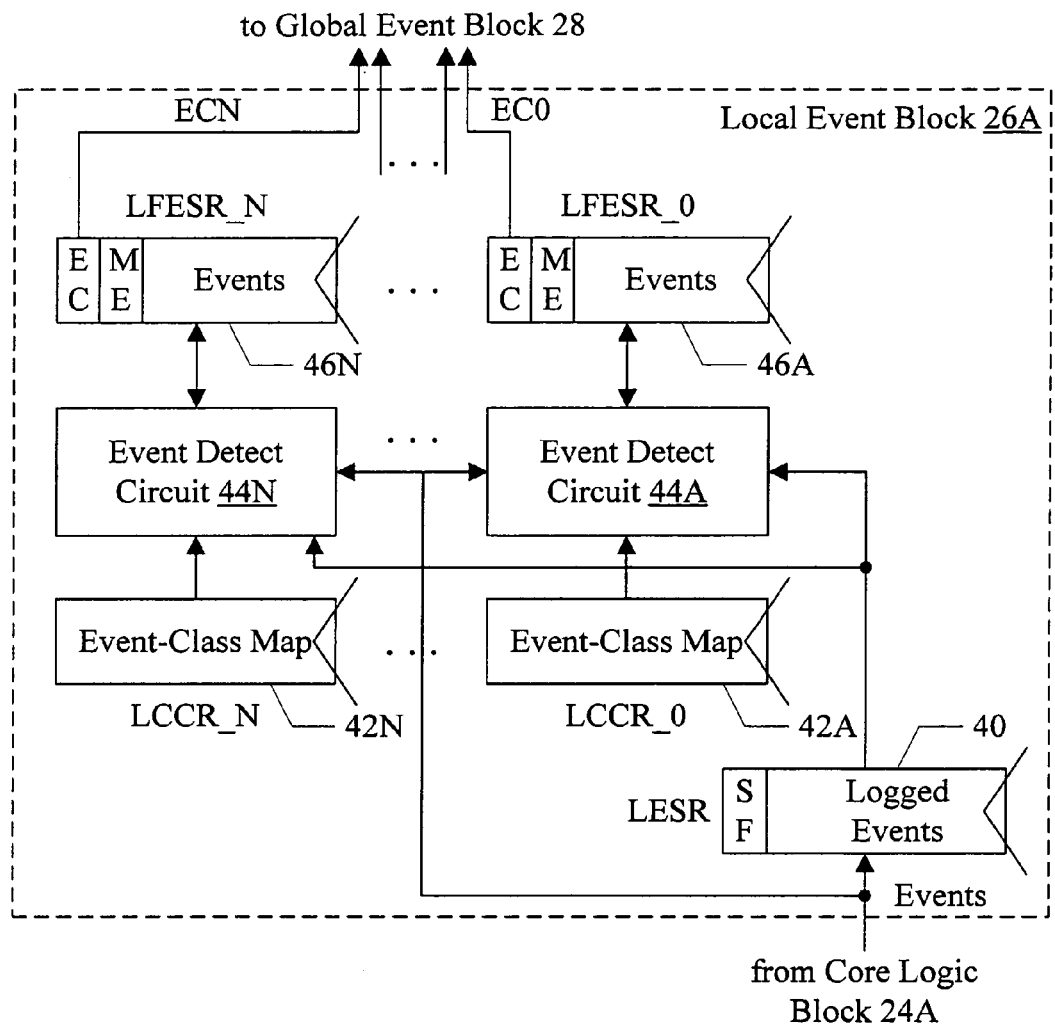
FIG. 3 is a block diagram of one embodiment of a local event block.

Turning now to FIG. 3, a block diagram of one embodiment of the local event block 26A is shown. Other local event blocks 26B-26L may be similar. In the illustrated embodiment, the local event block 26A includes a local event status register (LESR) 40, a set of local class control registers (LCCR_0 to LCCR_N) 42A-42N, a set of event detect circuits 44A-44N, and a set of local first event status registers (LFESR_0 to LFESR_N) 46A-46N. The LESR 40 is coupled to receive the events signals from the core logic block 24A. Additionally, the event detect circuits 44A-44N are coupled to receive the events signals as well. The LESR 40 is configured to log events indicated by the core logic block 24A, and provides the logged events to the event detect circuits 44A-44N. Each of the event detect circuits 44A-44N is coupled to a corresponding LCCR 42A-42N and a corresponding LFESR 46A-46N as shown in FIG. 3. The LESR 40, the LCCRs 42A-42N, and the LFESRs 46A-46N may comprise CSRs in this embodiment.

The LESR 40 is configured to accumulate the events signalled by the core logic block 24A. That is, the LESR 40 may store an indication of each identified event, and may accumulate the events until cleared by software (or a hardware clear mechanism, in other embodiments). The logged events field in the LESR 40 may include, for example, a bit position for each event that may be signalled by the core logic block 24A. If the event is signalled, the bit in the corresponding bit position may be set. The bit may remain set until cleared by software. Thus, the LESR 40 may be used to determine each event that has occurred at least once. In some embodiments, it may be useful for software to simulate an event. The software force (SF) field in the LESR 40 may be reserved for software to set. Software may set a bit corresponding to an event in the LESR 40 in order to simulate the occurrence of the event, and the SF bit in the SF field may be used as an indication (e.g. a reminder) to software that the event was software-generated rather than hardware-generated.

The LCCRs 42A-42N may be programmed to assign events to classes. There is one LCCR 42A-42N for each class, in this embodiment. Each LCCR 42A-42N stores an event-class map for the corresponding class. For example, the event-class map may comprise a bit vector with a bit position for each event. More particularly, each event may be assigned to the same bit position in the LCCRs 42A-42N and the LESR 40. If the bit is set, the event is mapped to the class. If the bit is clear, the event is not mapped to the class. An event may be mapped to more than one class in this embodiment, if desired.

The LFESRs 46A-46N may be provided to record the initial event that occurs in each class, respectively. That is, one LFESR 46A-46N may be provided for each class. The events field in the LFESRs 46A-46N may be bit fields similar to the logged events field. The bit corresponding to the initial event may be set, and other bits may be clear. If more than one event occurs concurrently, then the bit corresponding to each of the concurrent events may be set. Each LFESR 46A-46N may further include an EC bit and an ME bit, as described below.

In some embodiments, the CSRs may further include one or more event capture registers (ECRs). Each ECR may be used to capture additional information related to an event at the initial time that the event happens. That is, the ECR may capture the additional information at the initial occurrence of the event, and may be locked from subsequent updates until the event is cleared (or until all the events that share the ECR are cleared, for embodiments that have sharing as mentioned below). For example, an error checking/correction code (ECC) error may occur for a given address. The ECC error may be an event, and the occurrence of the event may cause the ECR to capture the address at which the ECC error was detected. In some embodiments, another register (an event auxiliary register, or EAR) may capture the information for the most recent occurrence of the event. That is, the EAR may not lock from update in response to the initial occurrence of the event, and may thus update at each occurrence of an event. Each ECR may have a corresponding EAR, or a subset of the ECRs may each have a corresponding EAR. In some embodiments, more than one event may share the ECR or EAR. For example, a correctable ECC error may be one event and an uncorrectable ECC error may be another event. Such events may share the ECR/EAR, and the ECR/EAR may include a disambiguation field that records which type of event corresponds to the information in the ECR/EAR.

The event detect circuits 44A-44N are provided to detect the initial event that occurs in each class. Each event detect circuit 44A-44N detects the initial event for one of the classes (corresponding to the LCCR 44A-44N and LFESR 46A-46N to which that event detect circuit 44A-44N is coupled). The event detect circuits 44A-44N use the event-class map for the class to determine which events are mapped to the class, and updates the LFESR 46A-46N with an indication of the initial event detected in the class. Additionally, once an event is detected, the event detect circuit 44A-44N may update the EC bit in the LFESR 46A-46N to indicate that at least one event in the class has been detected. The EC bit may be used as the EC signal to the global event block 28 for the class (e.g. EC0 from LFESR_0 46A). In some embodiments, a multiple event bit may be provided (ME) to indicate that at least one event in the class has occurred multiple times (i.e. more than once). The event detect circuit 44A may detect a multiple event occurrence and set the ME bit. In other embodiments, and ME field may be provided to unambiguously determine which events occurred more than once.

While the above description mentions one LCCR and one LFESR for each class, other embodiments may provide more than one LCCR and/or LFESR for each class, or may share one LCCR and/or LFESR between two or more classes (with separate fields in each shared register for each class).

Figure 4:
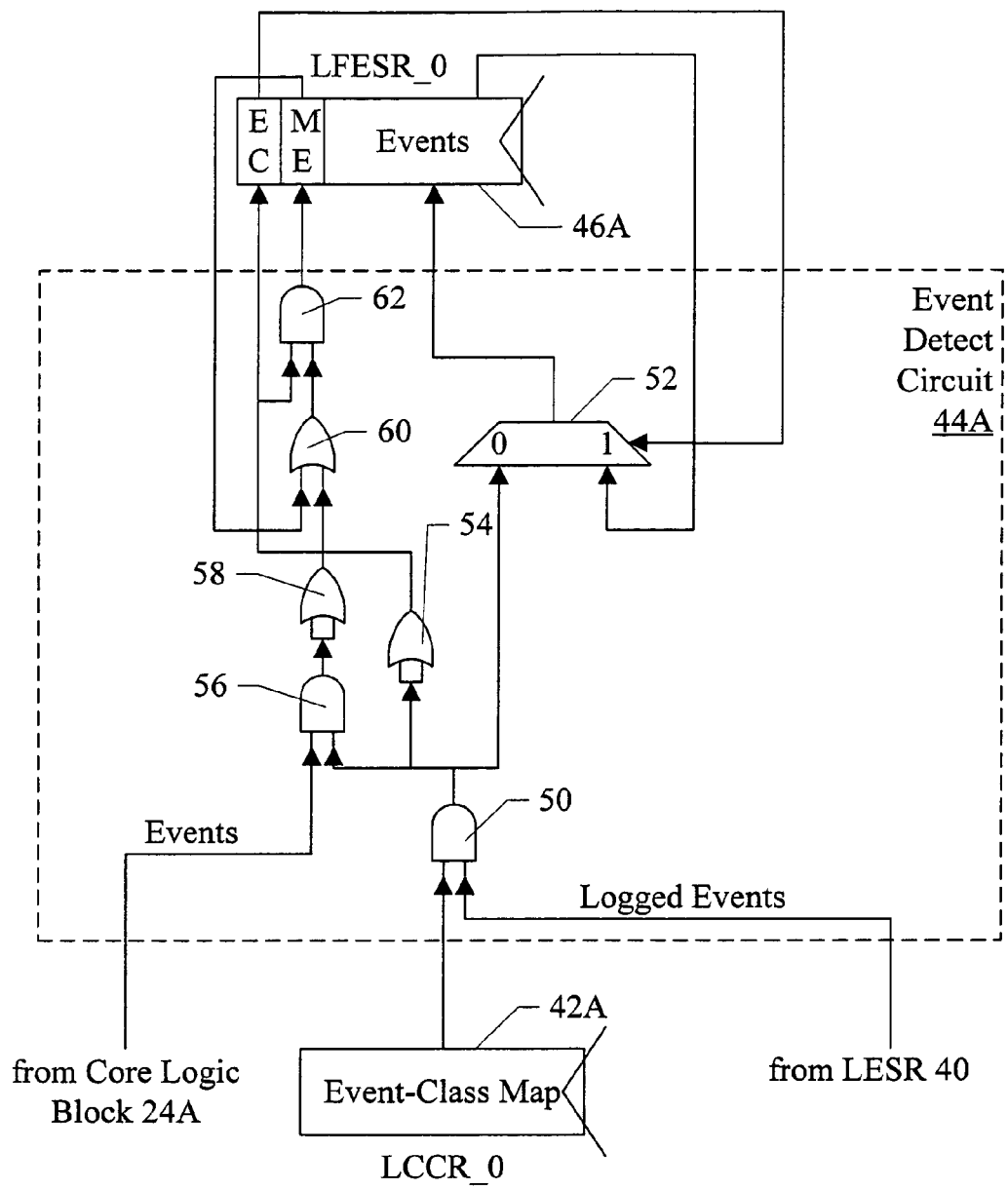
FIG. 4 is a block diagram of one embodiment of an event detect circuit shown in FIG. 3.

FIG. 4 is a block diagram of one embodiment of the event detect circuit 44A. Other event detect circuits (e.g. event detect circuit 44N) may be similar. Also shown for reference in FIG. 4 are the LFESR 46A and the LCCR 42A. The logic circuits shown in the embodiment of FIG. 4 are merely exemplary and any other logic circuits may be used, including Boolean equivalents of the circuitry shown in FIG. 4.

The event detect circuit 44A receives the logged events from the LESR 40, and classifies the events to the class corresponding to the event detect circuit 44A using the event-class map from the LCCR 42A. In the illustrated embodiment, the event-class map and the logged events are bit fields with a bit position corresponding to each event. Accordingly, the classification is performed by bitwise ANDing the event-class map bits and the logged events bits (represented by the AND gate 50 in FIG. 4). In other embodiments in which other encodings of logged events and/or event-class mappings are used, different circuitry may be used to classify the logged events.

The resulting bit vector is provided to the multiplexor (mux) 52 and an OR gate 54. The OR gate 54 ORs the bits of the resulting bit vector, thereby detecting if at least one bit in the resulting bit vector is set. In other words, the OR gate 54 determines if at least one event in the class has been logged. The output of the OR gate 54 may be used as the input to the EC bit in the LFESR 46A.

The mux 52 may be used to capture the initial event that occurs in the class. The selection control of the mux 52 is the EC bit in the LFESR 46A. Prior to the EC bit in the LFESR 46A being set, the resulting bit vector is selected through the mux 52. Thus, the initial time that an event is detected in the class, the resulting bit vector is stored into the events field of the LFESR 46A and the EC bit also is set. As long as the EC bit is set, the output of the events field of the LFESR 46A is selected through the mux 52, thus holding the contents of the events field constant. In other embodiments, the register 46A may include a hold input that controls the events field portion of the register 46A and the EC bit may be used to control the hold input, instead of including the mux 52.

The remaining circuitry shown in FIG. 4 may be used to generate the ME bit in this embodiment. Specifically, the events currently being signalled by the core logic block 24A may be bitwise ANDed with the resulting bit vector from the AND gate 50 (represented in FIG. 4 by the AND gate 56). In other embodiments that do not use a bit vector for one or more of the event indication, the event-class map, or the logged events, the AND gate 56 may be replaced by circuitry that processes the encoded values. If the result from AND gate 56 has at least one set bit, than an event that was previously logged in the LESR 40 and that is mapped to the class corresponding to the event detect circuit 44A is again being indicated. Thus, the bits of the result from AND gate 56 are ORed in the OR gate 58. To ensure that the ME bit remains set after it has been set the initial time, the output of the ME bit from the register 46A is ORed with the output of the OR gate 58 (in OR gate 60). Finally, the calculated ME bit is qualified with the output of the OR gate 54 in AND gate 62. This qualification permits clearing of the ME bit if the LESR or LCCR has been cleared by software. In some cases, software may clear an event for which an action has been initiated from the LCCR, to prevent recurrence of the event from causing multiple actions to be initiated. For example, if the action is a service processor interrupt, clearing the event from the LCCR may prevent flooding the service processor with interrupts for the same event. After servicing the event, software may update the LCCR to again have the event listed in the class.

Figure 5:
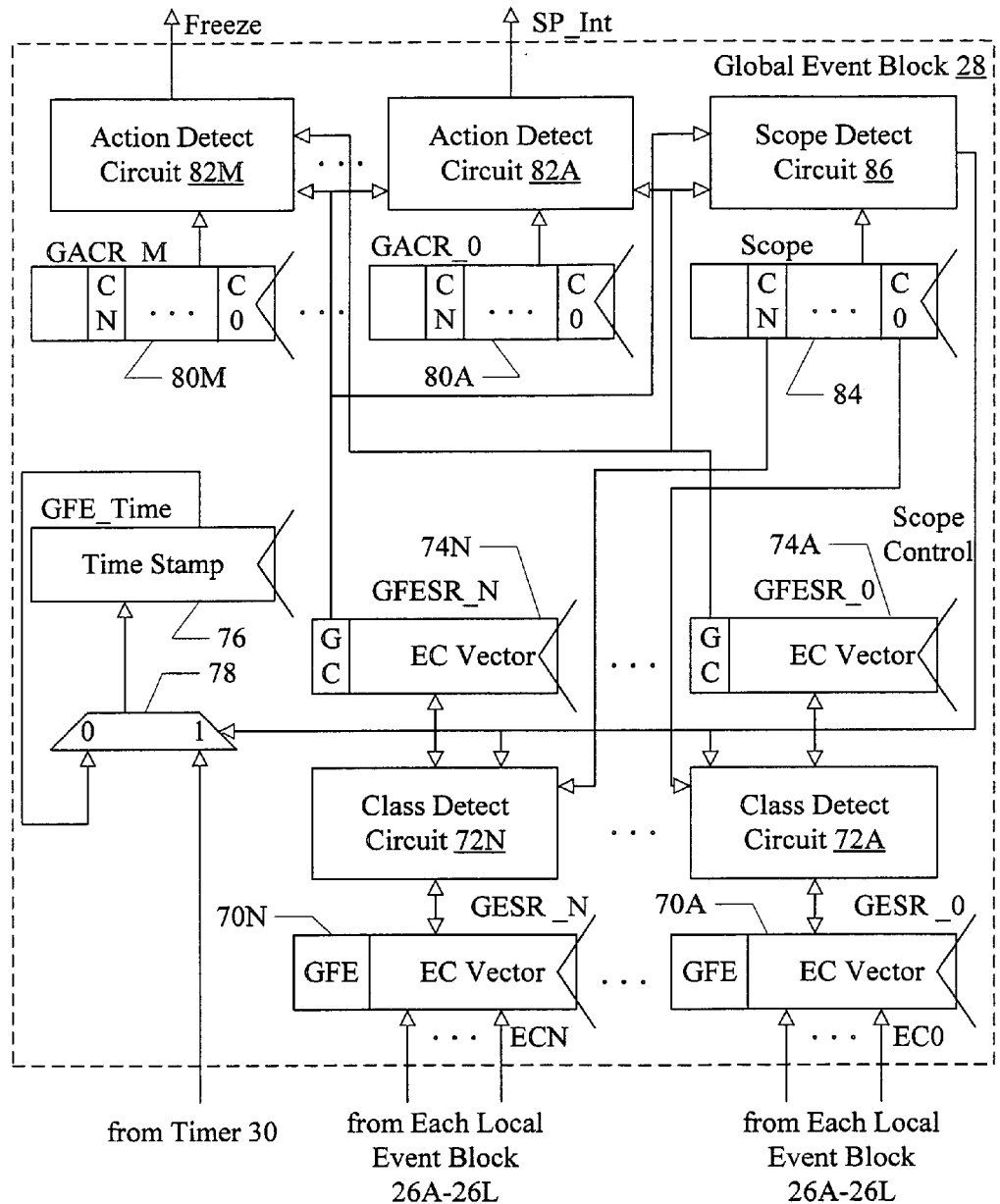
FIG. 5 is a block diagram of one embodiment of a global event block.

Turning now to FIG. 5, a block diagram of one embodiment of the global event block 28 is shown. In the embodiment of FIG. 5, the global event block 28 includes a set of global event status registers (GESRs) 70A-70N, a set of class detect circuits 72A-72N, a set of global first event status registers (GFESRs) 74A-74N, a global first event time (GFE_Time) register 76, a mux 78, a set of global action control registers (GACRs) 80A-80M, a set of action detect circuits 82A-82M, a scope register 84, and a scope detect circuit 86. The GESRs 70A-70N, the GFESRs 74A-74N, the GFE_Time register 76, the GACRs 80A-80M, and the scope register 84 are each CSRs.

There may be one GESR 70A-70N for each class. Each of the GESRs 70A-70N accumulate indications of which local event blocks 26A-26L are storing at least one event indication for an event in the corresponding class, similar to the LESR 40 accumulating events. For example, each of the GESRs 70A-70N may store an EC vector. The EC vector may include a bit position for each of the local event blocks 26A-26L. If the bit is set, the corresponding local event block 26A-26L is storing at least one event indication for an event in the corresponding class. If the bit is clear, the corresponding local event block 26A-26L is not storing such an event indication. The bit position may be filled with the corresponding EC bit as transmitted by the local event block 26A-26L. That is, the GESR 70A may receive EC0 from each of the local event blocks 26A-26L. GESR 70N may receive ECN from each of the local event blocks 26A-26L. Other GESRs (not shown) may receive the other EC bits from each of the local event blocks 26A-26L.

Additionally, in the illustrated embodiment, each GESR 70A-70N may include a global first event (GFE) bit. The bit may be used to identify which class was the initial class in which an event was detected. More particularly, if the scope register 84 is used, the bit may identify the initial class among the classes that are enabled in the scope register 84. Additional details regarding the scope register 84 are provided below. If the GFE bit is set, an event in the corresponding class was the initially detected event, as reported by the local event blocks 26A-26L to the global event block 28.

The GFESRs 74A-74N store indications of the initial local event block 26A-26L to detect an event in the corresponding class. There may be one GFESR 74A-74N for each class. In the illustrated embodiment, each GFESR 74A-74N may store an EC vector, similar to the GESRs 70A-70N. Additionally, each GFESR 74A-74N includes a global class (GC) bit, which may indicate that at least one event in the class has been detected in at least one local event block 26A-26L.

The class detect circuits 72A-72N are coupled to the respective GESRs 70A-70N and GFESRs 74A-74N. Each class detect circuit 72A-72N may be configured to detect the initial indication of an event in the corresponding class, and to update the respective GFESR 74A-74N accordingly. Additionally, the class detect circuits 72A-72N may be configured to generate the GFE bit for the respective GESR 70A-70N. In some embodiments employing the scope register 84, the class detect circuits 72A-72N may be coupled to receive the scope control signal from the scope detect circuit 86 as part of generating the GFE bit. Additional details for one embodiment of the class detect circuits 72A-72N are provided below with respect to FIG. 6.

The GACRs 80A-80M are programmable to map classes to actions. There may be one GACR 80A-80M for each action. In the illustrated embodiment, the GACRs 80A-80M are each programmable with a bit vector having a bit position for each class (C0 to CN). If the bit is set, the corresponding class is mapped to the action. If the bit is clear, the corresponding class is not mapped to the action. Other embodiments may use encoded values to map classes to actions.

Figure 7:
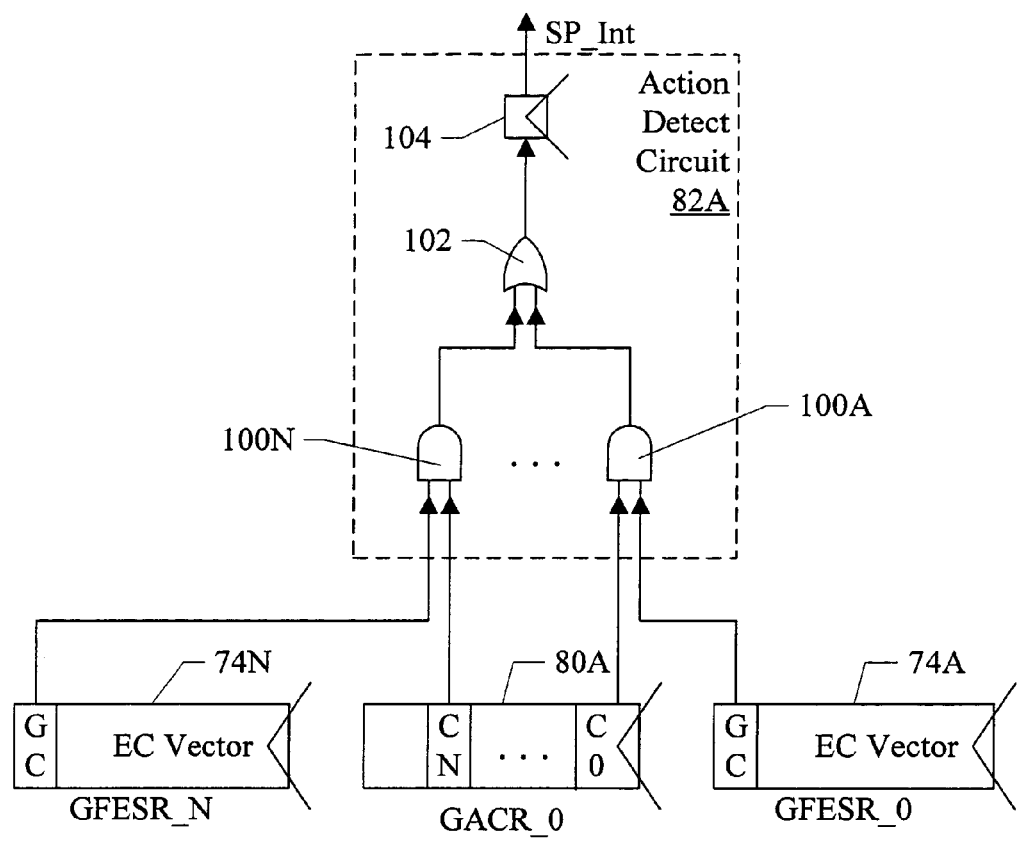
FIG. 7 is a block diagram of one embodiment of an action detect circuit shown in FIG. 5.

The action detect circuits 82A-82M detect whether or not a corresponding action is to be initiated, and initiate the action if so. In the embodiment of FIG. 5, for example, the action detect circuit 82A initiates the service processor interrupt ("SP_Int") and the action detect circuit 82M initiates the freeze ("Freeze"). Other action detect circuits (not shown) may initiate other actions. The action detect circuits 82A-82M may receive the GC bits from each of the GFESRs 74A-74N and the contents of the respective GACR 80A-80M. If the GC bit for a given class is set, and the class is mapped to the action in the corresponding GACR 80A-80M, the action detect circuit 82A-82M may initiate the action. Additional details of one embodiment of an action detect circuit 82A-82M are shown in FIG. 7 and described in more detail below.

In some embodiments, it may be desirable to program which classes cause the timestamp to be captured in the GFE_Time register 76 and the GFE bits in the GESRs 70A-70N. For example, some classes may be considered "information" or less severe, and thus capturing which of such classes have the initial event may not be desired. For other, more severe classes, it may be desirable to identify which class had the initial event (and which local event block 26A-26L, so that the particular event may be identified in that local event block's LFESRs). The scope register 84 and the scope detect circuit 86 may provide this functionality.

The scope register 84 may be programmable to indicate which classes are to cause the timestamp to be captured and the GFE bit in the GESR 70A-70N to be set. The scope register may include, for example, a bit vector having a bit position for each class. If the bit is set, the class is enabled in the scope register 84 (and detection of an event in the class will cause the timestamp to be captured and the GFE bit to be set). If the bit is clear, the class is not enabled in the scope register 84.

Figure 8:
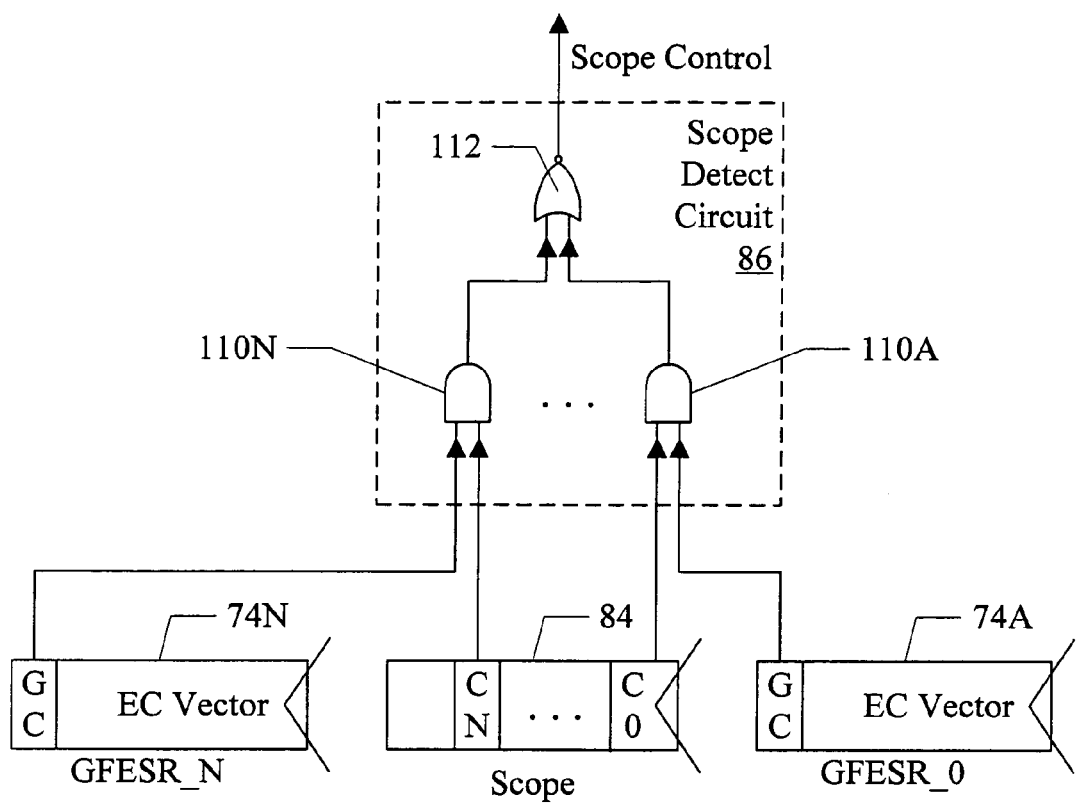
FIG. 8 is a block diagram of one embodiment of a scope detect circuit shown in FIG. 5.

The scope detect circuit 86 is coupled to the scope register 84 and to receive the GC bits from each of the GFESRs 74A-74N. If a GC bit corresponding to a class is set and the class is enabled in the scope register 84, the scope control signal is asserted. Otherwise, the scope control signal is deasserted. An exemplary embodiment of the scope detect circuit 86 is shown in FIG. 8 and described in more detail below.

The scope control signal is provided as the control input to the mux 78. In this embodiment, the scope control signal is asserted low. If the scope control signal is deasserted, the input from the timer 30 is passed through the mux 78 and stored in the GFE_Time register 76. If the scope control signal is asserted, the output of the GFE_Time register 76 is passed through the mux 78 and is stored in the GFE_Time register 76. Thus, the timestamp from the timer 30 at the time that the scope control signal is asserted is preserved as the timestamp in the GFE_Time register 76. In other embodiments, the GFE_Time register 76 may include a hold input that may be controlled by the scope control signal, and the mux 78 may be eliminated.

Similarly, the GFE bits in the GESRs 70A-70N may be preserved at the time the scope control signal is asserted. The GFE bit corresponding to the class that is enabled in the scope register 84 and which was the initial class to have an event detected among the classed enabled in the scope register 84 may be set, and the other GFE bits may be clear.

While the above description mentions one GESR and one GFESR for each class, other embodiments may provide more than one GESR and/or GFESR for each class, or may share one GESR and/or GFESR between two or more classes (with separate fields in each shared register for each class). Similarly, the above description mentions one GACR for each action, but other embodiments may provide more than one GACR for each action, or may share one GACR between two or more actions (with separate fields in each shared register for each action).

Figure 6:
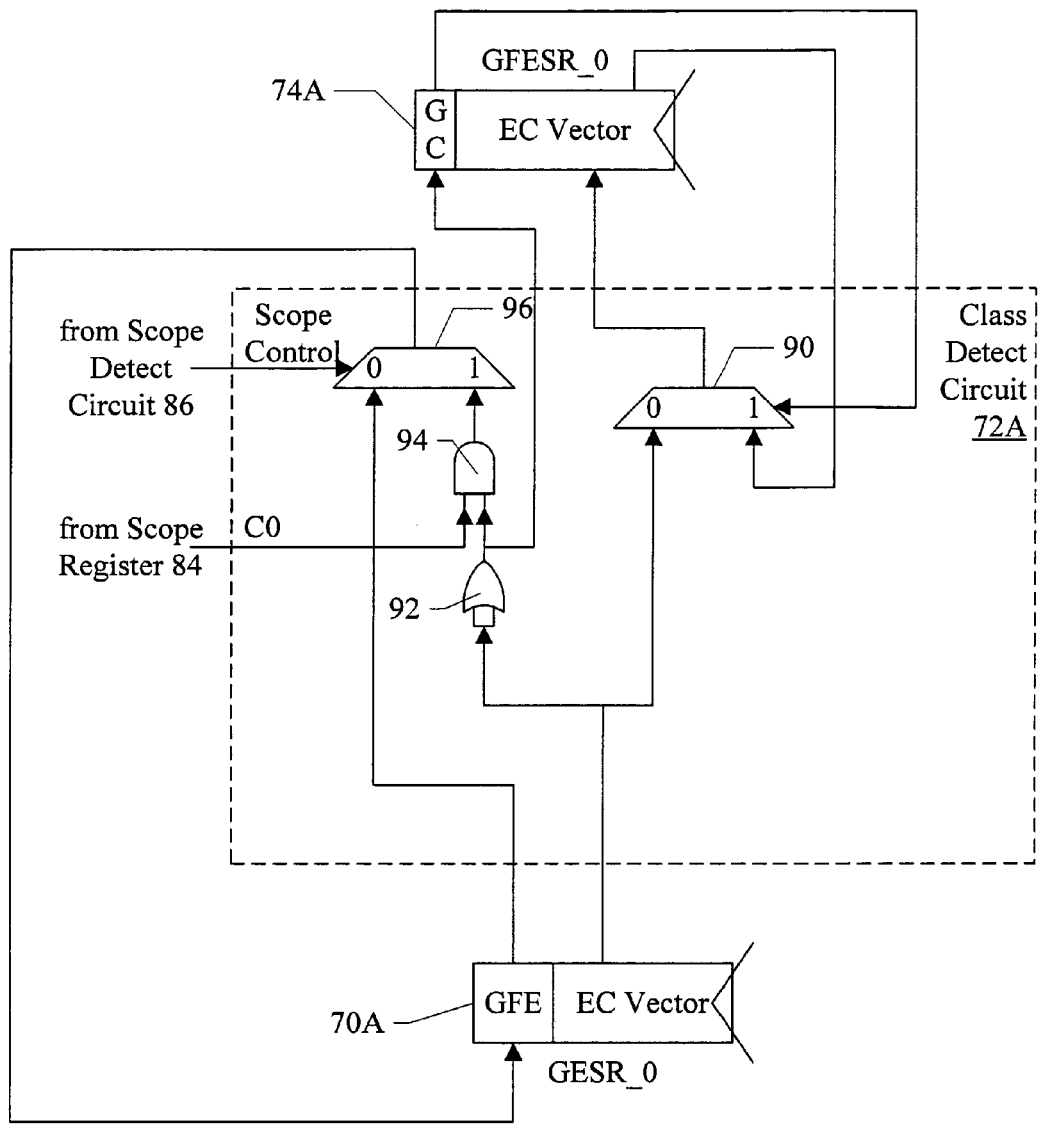
FIG. 6 is a block diagram of one embodiment of a class detect circuit shown in FIG. 5.

Turning now to FIG. 6, a block diagram of one embodiment of the class detect circuit 72A is shown. Other class detect circuits (e.g. class detect circuit 72N) may be similar. The GESR 70A and the GFESR 74A are also shown in FIG. 6 for reference. The logic circuits shown in the embodiment of FIG. 6 are merely exemplary and any other logic circuits may be used, including Boolean equivalents of the circuitry shown in FIG. 6.

The GC bit of the GFESR 74A is used as the selection control for a mux 90 in the class detect circuit 72A. While the GC bit is clear, the mux 90 selects the EC vector from the GESR 70A to be stored in the EC vector field of the GFESR 74A. Once the GC bit is set (which occurs when at least one bit in the EC vector from the GESR 70A is set), then mux 90 selects the EC vector from the GFESR 74A, thus holding the EC field constant. In other embodiments, the GFESR 74A may include a hold input that controls the EC field portion of the GFESR 74A. The hold input may be controlled by the GC bit, and the mux 90 may be eliminated.

The EC vector from the GESR 70A may also be processed to determine if at least one local event block 26A-26L has signalled that an event in the class has been recorded. In the illustrated embodiment, the bits of the EC vector may be ORed to make the determination (represented by the OR gate 92 in FIG. 6). In other embodiments in which encoded values are used instead of the bit vector, circuitry that processes the encoded values may be used instead of the OR gate 92. The output of the OR gate 92 supplies the GC bit in the GFESR 74A.

The output of the OR gate 92 may be qualified with whether or not the class is enabled in the scope register 84 to determine if the GFE bit in the GESR 70A should be set (AND gate 94). That is, if the class is enabled (C0 in the scope register 84 is set) and an event in the class has been detected in at least one local event block 26A-26L, the GFE bit is set (through the mux 96). The mux 96 has the scope control signal from the scope detect circuit as a selection control. If the scope control signal is deasserted, the output of AND gate 94 is selected through the mux 96 as input to the GFE bit of the GESR 70A. If the scope control signal is asserted, the output of the GFE bit from the GESR 70A is selected through the mux 96, preserving its value. In other embodiments, the GESR 70A may include a hold input controlling the GFE portion of the GESR 70A. The hold input may be controlled by the scope control signal, and the mux 96 may be eliminated.

Turning now to FIG. 7, a block diagram of one embodiment of the action detect circuit 82A is shown. Other action detect circuits (e.g. action detect circuit 82M) may be similar. The GFESRs 74A and 74N and the GACR 80A are also shown in FIG. 7 for reference. The logic circuits shown in the embodiment of FIG. 7 are merely exemplary and any other logic circuits may be used, including Boolean equivalents of the circuitry shown in FIG. 7.

As described above, if at least one event in a class has been recorded and that class is mapped to the action corresponding to the action detect circuit 82A, the action detect circuit 82A initiates the action. The GC bit for a class, from the corresponding GFESR 74A-74N, indicates that at least one event in that class has been recorded by at least one of the local event blocks 26A-26L. Thus, the GC bit for each class and the corresponding bit from the bit field in the GACR 80A are ANDed (AND gates 100A-100N in FIG. 7). The results of the AND gates 100A-100N are ORed (OR gate 102), and the result of the OR indicates whether or not the action is to be initiated. In some embodiments, the result of the OR may be captured in a register, flop, or other clocked storage device to ease timing at the receiver of the signal indicating the action (reference numeral 104).

FIG. 8 is a block diagram of one embodiment of the scope detect circuit 86. The GFESRs 74A and 74N and the scope register 84 are also shown in FIG. 8 for reference. The logic circuits shown in the embodiment of FIG. 8 are merely exemplary and any other logic circuits may be used, including Boolean equivalents of the circuitry shown in FIG. 8.

If at least one class of events has been detected (as indicated by the GC bit in the corresponding GFESR 74A-74N) that is enabled in the scope register 84, then the scope control signal is to be asserted. Accordingly, AND gates 110A-110N are provided to AND the GC bit from the GFESR 74A-74N corresponding to each class with the enable bit from the scope register 84 that corresponds to the class. In this embodiment, the scope control signal is asserted low and so the results of the AND gates 110A-110N are NORed (NOR gate 112) to produce the scope control signal. Other embodiments may have the scope control signal asserted high and an OR gate may be used in place of the NOR gate 112.

It is noted that bit fields or bit vectors are used in the above discussion to represent logged events in the LESR 40, event-class maps in the LCCRs 42A-42N, events in the LFESRs 46A-46N, EC vectors in the GESRs 70A-70N and GFESRs 74A-74N, or class indications in the GACRs 80A-80M and scope register 84. However, in other embodiments, any of these values may be encoded in any desired fashion.

In some embodiments, at reset of a given integrated circuit, the local event blocks 26A-26L and the global event block 28 may default to mapping all events to a predetermined class (e.g. class 0) and mapping class 0 to a predetermined action (e.g. the assertion of a pin). Thus, any event may be detectable after reset and prior to software configuring the local event blocks 26A-26L and the global event block 28.

While some embodiments above have described a two-level hierarchy for event reporting (the local event blocks and the global event block), other embodiments may employ additional levels of hierarchy. For example, additional levels of hierarchy may be implemented between the local event blocks and the global event block, at "higher" levels than the global event block, and/or at "lower" levels than the local event blocks, as desired.

Figure 9:
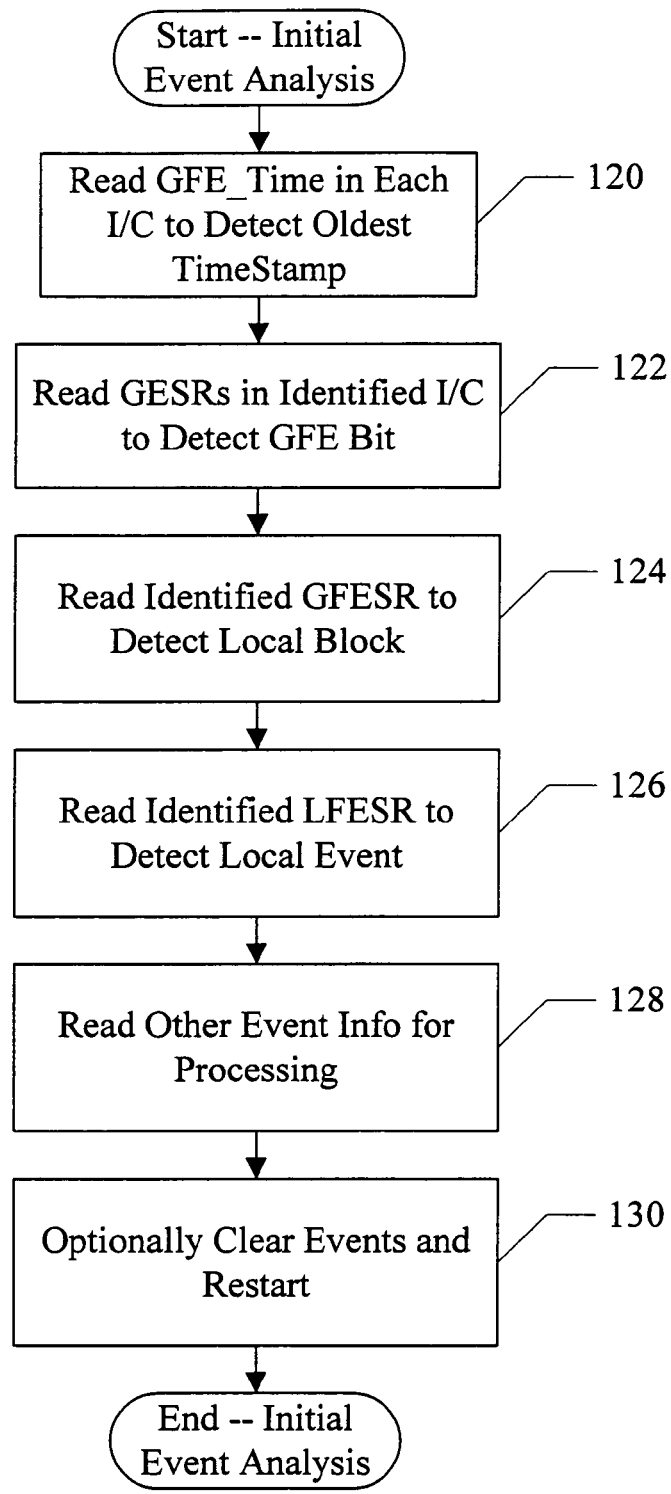
FIG. 9 is a flowchart illustrating operation of one embodiment of software that may be executed on a service processor shown in FIG. 1 to analyze an initial event.

Turning next to FIG. 9, a flowchart is shown illustrating operation of one embodiment of software that may be executed by the service processor 18 in FIG. 1 (or by another processor that is able to address the CSRs) to analyze an initial event identified by the event blocks. For example, the software may be executed in response to an interrupt of the service processor 18 initiated as an action by the global event block 28 in response to an event being detected. The software may comprise a plurality of instructions which, when executed, implement the operations shown in FIG. 9.

The software may read the GFE_Time register 76 in each integrated circuit 12A-12P to detect which integrated circuit 12A-12P has the oldest timestamp (block 120). That is, the software may detect which integrated circuit 12A-12P was the initial integrated circuit, in time, to detect an event which is enabled in its scope register 84 (or to detect any event mapped to a class, in embodiments that do not implement the scope register 84).

The software may read the GESRs 70A-70N in the integrated circuit 12A-12P identified in block 120, to detect which class has the GFE bit set (block 122). The class having the GFE bit set is the class in which the event was detected. In some cases, if different classes are mapped to different interrupt levels, the interrupt level indicates which class has a pending event. In such cases, the software need not read each GESR 70A-70N. The software may read the GFESR 74A-74N corresponding to the class that has the GFE bit set (block 124), to detect the local event block 26A-26L that recorded the event. The software may read the LFESR 46A-46N for the class in the identified local event block 26A-26L, to determine which event was detected (block 126).

Optionally, the software may read any other desired event information from any of the CSRs for processing (block 128). Which other CSRs are read may be implementation dependent, and may vary based on which event is logged as the initial event detected. After the processing of the event(s) is complete, the software may optionally clear the processed events and/or any other desired events (block 130). For example, the software may clear processed events from the LESRs 40 in the local event blocks 26A-26L.

Figure 10:
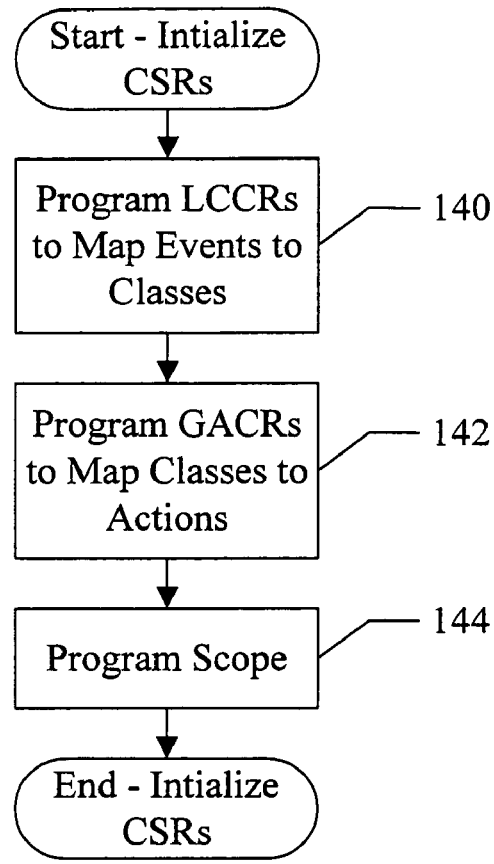
FIG. 10 is a flowchart illustrating operation of one embodiment of software that may be executed on a service processor shown in FIG. 1 to program classes and/or actions.

FIG. 10 is a flowchart illustrating operation of one embodiment of software that may be executed by the service processor 18 in FIG. 1 (or by another processor that is able to address the CSRs) to program the CSRs. For example, the software may be executed as part of initializing the system 10 for operation, or at any time that the mapping of events to classes or classes to actions is to be changed. The software may comprise a plurality of instructions which, when executed, implement the operations shown in FIG. 10.

The software may program the LCCRs 42A-42N in each of the local event blocks 26A-26L to map events to the desired classes (block 140). Since the events in the local event blocks 26A-26L may differ from each other, and even a similar event in different local event blocks 26A-26L may be handled differently, the mapping of events to classes may differ in each local event block 26A-26L. The software may program the GACRs 80A-80M to map classes of events to actions (block 142). The software may also program the scope register 84 to enable the desired classes (block 144).

Figure 11:
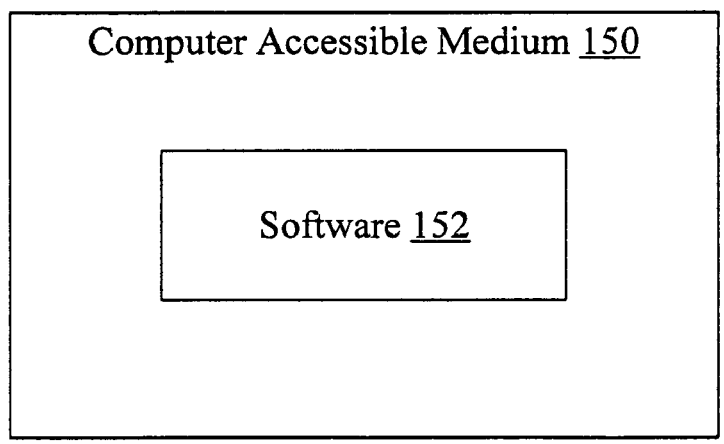
FIG. 11 is a block diagram of one embodiment of a computer accessible medium.

Turning now to FIG. 11, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 150 in FIG. 11 may be encoded with software 152. The software 152 may comprise instructions which, when executed, implement the functionality of one or both of FIGS. 9-10. Generally, the computer accessible medium 150 may store any set of instructions which, when executed, implement a portion or all of the flowcharts shown in one or more of FIGS. 9-10. In some embodiments, a computer accessible medium similar to the computer accessible medium 150 may be included in the system 10.

Numerous variations and modifications will become apparent to those skilled in the art once the above disclosure is fully appreciated. It is intended that the following claims be interpreted to embrace all such variations and modifications.

What is claimed is:

1. An apparatus comprising:
    a plurality of core logic blocks, each of the plurality of core logic blocks configured to generate one or more indications of one or more events;
    a plurality of first event blocks, wherein each first event block of the plurality of first event blocks is coupled to a respective core logic block of the plurality of core logic blocks to receive the one or more indications from the respective core logic block, and wherein each first event block comprises at least one register configured to record which events have been indicated by the respective core logic block, wherein each event is assigned to a bit position within the register at which that event is recordable, and wherein each first event block is configured to classify at least one event into one or more of a plurality of classes, and wherein each first event block comprises at least one second register programmable with a mapping of events to the plurality of classes; and
    a second event block coupled to the plurality of first event blocks, wherein the second event block is configured to initiate one or more actions responsive to one or more events recorded in one or more of the plurality of first event blocks.

2. The apparatus as recited in claim 1 wherein each first event block is physically located near the respective core logic block.

3. The apparatus as recited in claim 1 wherein each first event block is configured to signal to the second event block which classes of the plurality of classes have been detected.

4. The apparatus as recited in claim 3 wherein the second event block is configured to initiate the actions responsive to which classes are indicated by the plurality of first event blocks.

5. The apparatus as recited in claim 1 wherein each first event block is configured to record an initial event detected in each of the plurality of classes.

6. The apparatus as recited in claim 5 wherein each first event block comprises at least one additional register configured to record an identifier of the initial event detected in each of the plurality of classes.

7. The apparatus as recited in claim 6 wherein each first event block is further configured to detect whether or not multiple instances of an event have occurred, and wherein the additional register is further configured to record a multiple event indication indicating whether or not multiple instances of an event have been occurred.

8. The apparatus as recited in claim 6 wherein the additional register is further configured to record, for each class of the plurality of classes, whether or not at least one event in that class has occurred.

9. The apparatus as recited in claim 1 wherein the second event block is programmable with a mapping of events to actions.

10. The apparatus as recited in claim 9 wherein each first event block is configured to classify at least one event into one or more of a plurality of classes, and wherein the mapping of events to actions is indicated by mapping a given class of the plurality of classes to one or more of the actions.

11. The apparatus as recited in claim 9 wherein the second event block comprises at least one register programmable with the mapping.

12. The apparatus as recited in claim 1 wherein the second event block comprises at least one register configured to record an identifier of an initial event block of the plurality of first event blocks, the initial event block being an initial detector of an event within a given class of events.

13. The apparatus as recited in claim 12 further comprising a timer coupled to the second event block, wherein the second event block is configured to capture a timestamp from the timer responsive to detecting the initial event block.

14. The apparatus as recited in claim 13 wherein the second event block comprises at least one additional register programmable to indicate which classes cause a capture of the timestamp, and wherein the second event block is configured to capture the timestamp responsive to a value in the additional register.

15. The apparatus as recited in claim 14 wherein the second event block further comprises at least one second additional register configured to record, for each class of the plurality of classes, a second identifier for each first event block that has recorded an event in that class.

16. The apparatus as recited in claim 15 wherein the at least one second additional register is further configured to record a second first event indication for each class indicative of whether or not that class caused the capture of the timestamp.

17. A system comprising a plurality of integrated circuits coupled to communicate during use, wherein at least one of the plurality of integrated circuits comprises the apparatus as recited in claim 1.

18. A system comprising:
    a plurality of integrated circuits coupled to communicate during use, wherein at least one of the plurality of integrated circuits comprises:
        a plurality of core logic blocks, each of the plurality of core logic blocks configured to generate one or more indications of one or more events;
        a plurality of first event blocks, wherein each first event block of the plurality of first event blocks is coupled to a respective core logic block of the plurality of core logic blocks to receive the one or more indications from the respective core logic block, and wherein each first event block comprises at least one register configured to record which events have been indicated by the respective core logic block, wherein each event is assigned to a bit position within the register at which that event is recordable, and wherein each first event block is configured to classify at least one event into one or more of a plurality of classes, and wherein each first event block comprises at least one second register programmable with a mapping of events to the plurality of classes; and a second event block coupled to the plurality of first event blocks, wherein the second event block is configured to initiate one or more actions responsive to one or more events recorded in one or more of the plurality of first event blocks; and a service processor configured to access the registers.

19. The system as recited in claim 18 wherein each first event block is configured to classify at least one event into one or more of a plurality of classes.

20. The system as recited in claim 19 wherein each first event block is configured to signal to the second event block which classes of the plurality of classes have been detected, and wherein the second event block is configured to initiate the actions responsive to which classes are indicated by the plurality of first event blocks.

21. The system as recited in claim 19 wherein a mapping of events to the plurality of classes is programmable in each first event block.

22. The system as recited in claim 21 wherein each first event block comprises at least one additional register programmable with the mapping.

23. The system as recited in claim 19 wherein each first event block is configured to record an initial event detected in each of the plurality of classes.

24. The system as recited in claim 23 wherein each first event block comprises at least one additional register configured to record an identifier of the initial event detected in each of the plurality of classes.

25. The system as recited in claim 24 wherein each first event block is further configured to detect whether or not multiple instances of an event have occurred, and wherein the additional register is further configured to record a multiple event indication indicating whether or not multiple instances of an event have been occurred.

26. The system as recited in claim 24 wherein the additional register is further configured to record, for each class of the plurality of classes, whether or not at least one event in that class has occurred.

27. The system as recited in claim 18 wherein the second event block is programmable with a mapping of events to actions.

28. The system as recited in claim 27 wherein each first event block is configured to classify at least one event into one or more of a plurality of classes, and wherein the mapping of events to actions is indicated by mapping a given class of the plurality of classes to one or more of the actions.

29. The system as recited in claim 27 wherein the second event block comprises at least one register programmable with the mapping.

30. An apparatus comprising:
a core logic block configured to generate one or more indications of a plurality of events detectable by the core logic block; and
an event block coupled to the core logic block to receive the indications, the event block comprising one or more registers programmable to map at least one event of the plurality of events to one or more of a plurality of classes, wherein each register is a clocked storage device in the event block's circuitry.

31. The apparatus as recited in claim 30 wherein the one or more registers comprises at least one register per class of the plurality of classes.

32. The apparatus as recited in claim 30 wherein the event block is configured to detect an initial event to occur in each class of the plurality of classes.

33. The apparatus as recited in claim 32 wherein the event block comprises at least one additional register configured to record an indication of the initial event in each class.

34. The apparatus as recited in claim 30 wherein at least one class of the plurality of classes is mapped to one or more actions to be taken when events in that class are detected.

35. The apparatus as recited in claim 34 wherein the mapping of the at least one class to one or more actions is programmable.

36. The apparatus as recited in claim 30 wherein the event block is further configured to map a second event of the plurality of events to none of the plurality of classes.

37. A system comprising a plurality of integrated circuits coupled to communicate during use, wherein at least one of the plurality of integrated circuits comprises the apparatus as recited in claim 30.

38. An apparatus comprising:
at least one core logic block configured to generate one or more indications of a plurality of events detectable by the core logic block; and
an event circuit coupled to the core logic block to receive the indications, the event circuit programmable to map at least one event of the plurality of events to one or more of a plurality of actions to be taken responsive to the events, wherein the event circuit comprises one or more registers programmable to map the events to the actions, and wherein each register is a clocked storage device within the event circuit.

39. The apparatus as recited in claim 38 wherein the event circuit comprises at least one local event block coupled to the at least one core logic block and a global event block coupled to the at least one local event block, wherein the at least one local event block is programmable to classify at least one event of the plurality of events into one or more of a plurality of classes, and wherein the global event block is programmable to map at least one class of the plurality of classes to one or more of the plurality of actions, and wherein the classifying of the plurality of events and the mapping of events to the plurality of actions comprises mapping the at least one event to one or more of the plurality of actions.

40. The apparatus as recited in claim 38 wherein the plurality of actions comprise generating an interrupt for a service processor.

41. The apparatus as recited in claim 38 wherein the plurality of actions comprise generating a signal that may be observed by a user.

42. The apparatus as recited in claim 38 wherein the plurality of actions comprise freezing a state of the at least one core logic block and the event circuit.

43. The apparatus as recited in claim 38 wherein the apparatus is implemented in an integrated circuit, and wherein the plurality of actions comprise causing the integrated circuit to cease communicating with other integrated circuits.

44. The apparatus as recited in claim 38 wherein the apparatus is implemented in an integrated circuit which is included in a system with other integrated circuits during use, and wherein the plurality of actions comprise causing the integrated circuit and the other integrated circuits to cease communicating during use.

45. The apparatus as recited in claim 38 wherein the event circuit is further configured to map at least a second event of the plurality of events to none of the plurality of classes.

46. A system comprising a plurality of integrated circuits coupled to communicate during use, wherein at least one of the plurality of integrated circuits comprises the apparatus as recited in claim 38.

47. A method comprising:

generating one or more indications of a plurality of events detectable by a core logic block;

programming one or more control/status registers with a mapping of at least one event of the plurality of events to one or more of a plurality of classes, wherein each control/status register is a clocked storage device; and classifying the plurality of events responsive to the mapping.

48. A method comprising:

generating one or more indications of a plurality of events detectable by a core logic block;

programming one or more control/status registers with a mapping of at least one event of the plurality of events to one or more of a plurality of actions, wherein each control/status register is a clocked storage device; and initiating one or more of the plurality of actions responsive to the one or more indications and the mapping.

\* \* \* \* \*